INVENTORS
DONALD P. FAULK
PETER A. BEST
BY *Elmer J. Gorn*
ATTORNEY

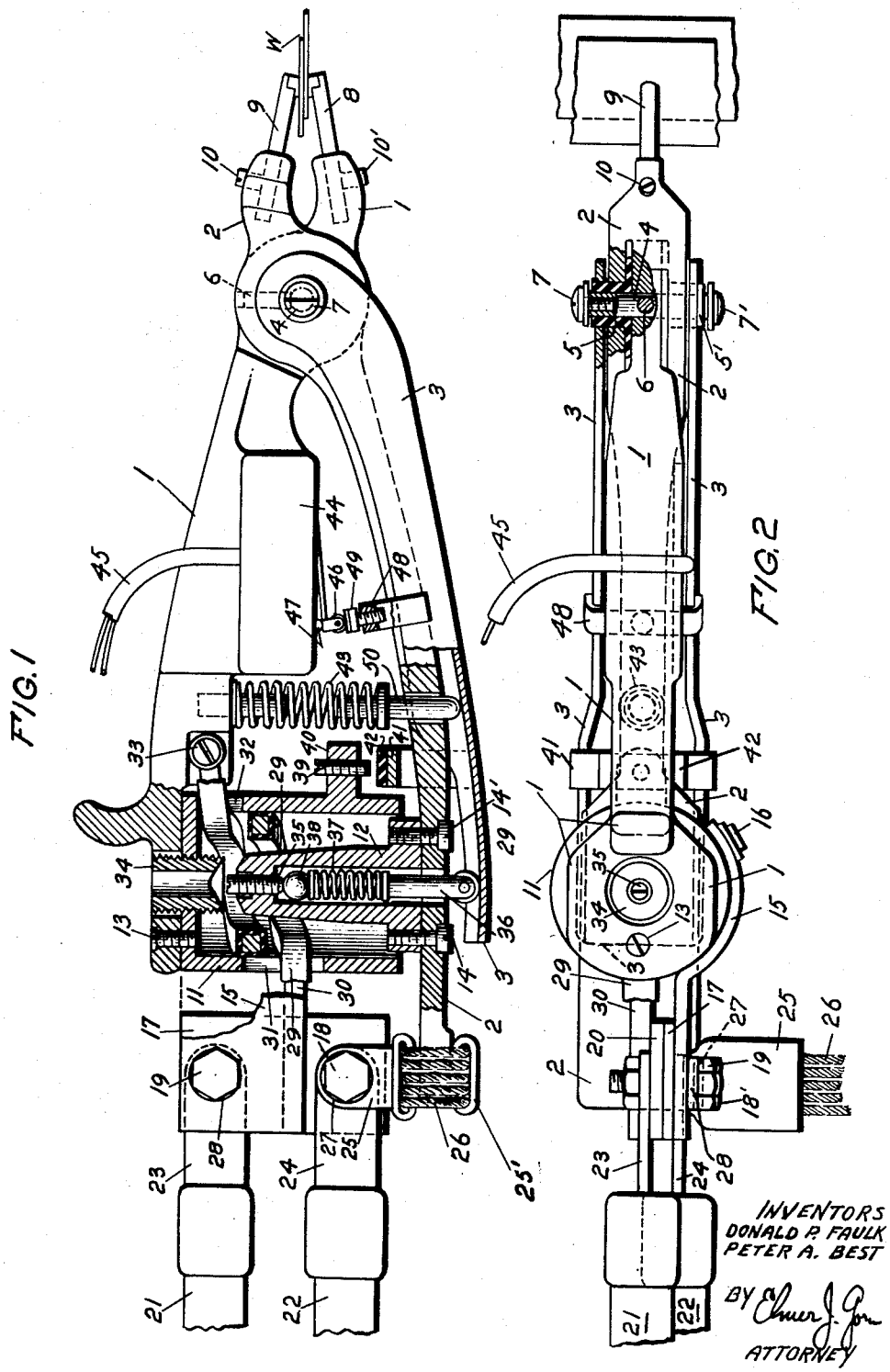

Patented Sept. 21, 1954

2,689,899

UNITED STATES PATENT OFFICE 2,689,899

WELDING APPARATUS

Donald P. Faulk, Lexington, and Peter A. Best, Newton Highlands, Mass., assignors to Raytheon Manufacturing Company, Newton, Mass., a corporation of Delaware Application November 30, 1951, Serial No. 259,202

9 Claims. (Cl. 219—4)

This invention relates to a welding apparatus for producing a more even distribution of heat input to the welding load over the welding cycle and more particularly relates to a welding head or pliers which are capable of exerting a pressure on the pieces to be welded which is responsive to and substantially dependent upon the welding current.

An object of this invention is to provide a welding head capable of exerting a change in magnitude of the force exerted on the work pieces to be welded which remains substantially in phase with the changes in magnitude of the welding current.

Another object of this invention is to provide welding pliers which are responsive to the welding current passing through the handles thereof for producing a movement together of a closure of the handles which is substantially instantaneously proportional to the magnitude of the welding current.

A further object of this invention is to provide a welding head capable of applying a more nearly constant rate of heat input to the work pieces to be welded over the input cycle of welding current.

Still another object of this invention is to provide a welding tool for preventing the rupture or burning out of the work pieces to be welded resulting from an uneven rate of application of heat to the welding load over the welding cycle.

Fig. 1 is an elevation view, partly in section, of the welding pliers according to the invention;

Fig. 2 is a plan view of the welding pliers shown in Fig. 1;

Figure 3:
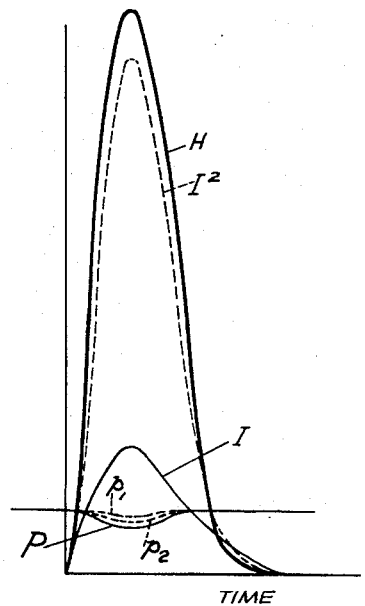
Fig. 3 is a curve illustrating certain operating characteristics existing in previous welding pliers.

In the electrical resistance welding of two pieces of metal the pieces are heated to a point where the metal in the welded area becomes plastic and the pieces are moved together beyond the contact plane, causing the metal of each piece to flow into and become ingrained in the metal of the other piece.

With welding heads of the prior art, a relatively high initial pressure is applied to the work pieces. When the welding current passes through the conducting handles or arms of the pliers in opposite directions, the arms will move apart, thereby decreasing the pressure exerted on the work pieces. In addition, the passage of current in the welding load causes a plasticity of the work pieces; the softened metal work pieces offer less resistance to the arms causing a further reduction in pressure. The combination of these two effects causes a reduction in pressure during the welding current cycle. The resistance offered to the welding circuit by the work pieces is inversely proportional to the pressure exerted thereon; that is, the resistance increases during the welding current cycle. Since the rate of heat input to the work pieces is proportional to the square of current and to resistance, and since the peak of the current impulse is supplied to the work while the resistance is high, intense heat is developed at the work pieces over a relatively short period of time. This burst of heat energy causes an impairment of the electrode area and work piece area and possibly a rupture or burning through of the work pieces. In order to achieve a more even rate of application of heat energy applied to the work during the welding cycle, a solenoid having a coil and an armature is associated with the conducting handles or arms of the pliers. The coil is mounted in series with one of the conducting handles and the armature is attached to the other handle. When welding current flows, the coil is energized and the armature, including the handle attached thereto, is drawn toward the other handle. This movement together of the handles increases the pressure exerted on the work pieces during the welding cycle. Since the force pulling the handles together and the resulting pressure exerted on the work pieces are dependent on the current flowing in the welding circuit including the conducting handle, the change in magnitude of the pressure exerted on the work pieces can be made to remain substantially in phase with the change in magnitude of the current during the welding cycle. In this way, the heat is applied more evenly over the welding cycle instead of being applied in short bursts.

Referring now to Fig. 1, a resistance welding load W comprising two metal work pieces to be welded is connected to the secondary winding of a welding transformer (not shown) whose primary is adapted to be supplied with current impulses from the discharge of an electrical energy storage device such as a condenser. Various methods of discharging the energy stored in the condenser into the welding load may be used. Since the invention does not reside in the energy supply circuit, the details thereof are not illustrated.

The high current, low voltage output of the energy storage circuit is connected by means of heavy cables 21 and 22 to the conducting handles or arms 1 and 2 of the welding pliers, in a manner described later. The conducting arms 1 and 2, made of copper or some other electrically conducting material, are pivoted near one end about a shaft 4 passing through both arms. A third or auxiliary arm 3, preferably made of aluminum or plastic, is also mounted on shaft 4. Arms 1 and 2 are insulated from one another by means of a pair of T-shaped nylon insulating bushings 5. A set screw 6 serves to retain shaft 4 in position and a pair of screws 7 and 7' are screwed into internally threaded shaft 4 to hold the three arms together. The end of shaft 4 extends beyond the edge of nylon bushing 5 so that the screws 7 and 7' will not bind. Welding electrodes 8 and 9 are inserted in the recesses in one end of arms 1 and 2, respectively, and are held in place by set screws 10 and 10'.

A solenoid comprising a core 11 and armature 12 forms part of the welding pliers. Cylindrical core 11 made of Swedish charcoal iron or any other material having a high permeability is attached to the inner surface of arm 1 by one or more screws 13. An armature 12, made of the same material as core 11, is attached by screws 14 and 14' to the inner surface of arm 2. Curved steel bracket 15 is mounted on the outside of core 11 by means of screws 16 and serves as a mechanical support for input cables 21 and 22. Lugs 23 and 24 are attached to the ends of cables 21 and 22, respectively, to facilitate mounting of the cables. A flexible copper strap 26 having lugs 25 and 25' attached to the ends thereof is connected between lug 24 on cable 22 and one end of arm 2. An insulating plate 17 made of any insulating material is adapted to be bolted to bracket 15 and serves to isolate the cables from one another. Bracket 15 is shown as extending approximately half the length of insulating plate 17, in which case cable lugs 24 and 25 are connected directly to the bottom portion of plate 17 by means of a bolt 18 carrying an insulating washer 27. A bolt 19 passing through the washer 28, bracket 15, insulating plate 17, copper plate 20 and lug 23, in that order, provides a rigid mounting for cable 21. One end of a heavy coil 30 covered by insulation 29 is brazed or otherwise attached to copper plate 20. Coil 30 enters the iron core 11 through a slot 31 therein and is wrapped around the inner surface of the core. The other end of coil 30 is brought out of core 11 through a second slot 32, as shown in Fig. 1, and attached to conducting arm 1 by a screw 33. It is now obvious that a series circuit is provided from one side of the supply circuit (not shown) to lead 21, lug 23, plate 20, coil 30, arm 1, electrode 8, work pieces W, electrode 9, arm 2, strap 26, lug 25, lug 24, conductor 22 and back to the other side of the supply circuit.

A threaded plug 34 is screwed into the top wall of cylindrical core 11 to vary the air gap in the solenoid. The force exerted between large flat pole faces having an area large as compared to the distance between them is directly proportional to the area of the pole faces and inversely proportional to the third power of the distance between them. The lower surface of plug 34 is made conical so as to make the force existing between the pole faces as nearly as possible proportional to the reciprocal of the first power of the distance between the pole faces. By varying the position of plug 34 the air gap in the magnetic circuit is changed and the flux, which is inversely proportional to the reluctance, is changed. Plug 34, therefore, serves to adjust the forging force on the work pieces to be welded. If plug 34 is screwed farther into core 11, the maximum force on work pieces W during the welding cycle, for a given value of welding current, is increased.

An initial force adjusting means is provided which comprises a follower rod 36, spring 37, ball bearing 38 and screw 35. A follower rod 36 has a roller at one end which bears against the inner surface of auxiliary arm 3, as shown in Fig. 1. A spring 37 is mounted between the other end of rod 36 and a ball bearing 38. The latter reduces friction in the movement of the initial force adjusting means. Screw 35 is the initial force adjusting screw which is screwed into an opening in the top of armature 12. By varying the position of screw 35 the tension in spring 37 is varied, thereby effecting a variation in the initial force applied to work pieces W. This initial force is adjusted to a value sufficient to hold work pieces W firmly together. An adjustable screw 39 in projecting portion 40 of core 11 is provided for limiting the force which can be applied to the work pieces. A bracket 41 carrying an insulating cap 42 is welded or otherwise fixedly attached to the sides of arm 3 and surrounds arm 2. Arms 1 and 3 are gripped by hand and squeezed together until bracket 41 comes against limit screw 39. The latter is so adjusted that, when the desired force on work pieces W is reached, bracket 41 just contacts screw 39. Once arm 3 is squeezed against arm 2, the latter is carried along with arm 3. Were it not for limit screw 39, arms 1 and 2 could be squeezed so hard together that the force exerted on work pieces W would be excessive; moreover, the desired effect of the initial pressure adjusting means would be completely nullified; it is extremely difficult to accurately adjust the force on work pieces W by resort to the operator's sense of touch. A spring 43 mounted between two plungers 50, each having one end mounted, in turn, between the under sides of arms 1 and 3, serves to insure that arms 2 and 3 are cleanly separated from arm 1 at the end of the welding cycle.

A switch 44 whose contacts are normally biased open is mounted on arm 1, as shown in Fig. 1. When the pliers are gripped, arm 3 moves toward arm 1 until screw 49 carried in bracket 48 strikes actuating lever 46 and forces it against actuating button 47. The latter is pressed against one of the internal contacts to move it into electrical connection with the other internal contact. Switch 44 is thereby closed and a circuit is provided through cable 45 to an initiating circuit in the primary of the welding control circuit. Bracket 48 is welded to the outer surface of arm 3 in a manner similar to bracket 41. Adjusting screw 49 is provided in bracket 48 for effecting closure at the correct time regardless of the thickness of work pieces W.

The cycle of operation will now be set forth. Initially arms 2 and 3 will be well separated from arm 1 because of the preceding flyback action of spring 43. The work pieces W are inserted between electrodes 8 and 9 and the arms or handles 1 and 3 are gripped by hand and squeezed, causing arm 2 to move toward arm 1 until an initial force, determined by the setting of screw 35, is exerted on the work. This force is comparatively small, being sufficient to hold the electrodes together firmly. This force is limited by means of limit screw 39 which prevents arm 2 from being moved toward arm 1 beyond a predetermined amount.

The moment the aforesaid initial force on the work pieces has been established, and as soon as adjustable screw 49 strikes actuating lever 46 of switch 44, the internal contacts of switch 44 are closed, as previously explained, thereby initiating the flow of high amperage welding current in a circuit including welding transformer secondary, arms 1 and 2, coil 30, electrodes 8 and 9 and work piece W. The current flowing through coil 30 is in phase with the welding current since the coil is in series with the welding circuit. The flux set up in core 11 by the current in coil 30 causes armature 12 to be pulled upward toward the top of core 11, and arm 2 is pulled toward arm 1 by an amount dependent upon the flux in the magnetic circuit, which is, in turn, dependent upon the magnitude of the welding current. This closure of arms 1 and 2 effects an additional pressure on work pieces W. By proper design of the solenoid the force exerted on the work pieces can be made substantially instantaneously proportional to the square of the welding current.

It is desirable to produce a change in magnitude of the force exerted on the work pieces which remains substantially in phase with the change in magnitude of the welding current. The latter condition is not exactly realized in practice owing, in part, to the inertia of moving arms 1 and 2. A definite time is required after a force is applied at the handles of the pliers before a force can be applied to the work pieces and the latter force is not removed until a short time after the cessation of the former. If the mass of the arms is kept small and the mechanical rigidity high, that is, if the arms are of rigid, inelastic, light construction, this delay is considerably reduced, so that the force exerted on the work pieces is very nearly proportional to the square of the welding current.

The curves of Fig. 3 explain certain operating characteristics of previously constructed welding pliers. The welding impulse is shown by curve I. A current square curve is labeled I². The welding current passes through arms 1 and 2, which are substantially parallel, in opposite directions. Two parallel conductors carrying a current in opposite directions repel one another since the flux lines are concentrated at the center of the conductors and the conductors tend to move so as to include as much flux as possible. This separation of arms 1 and 2 owing to the above-mentioned phenomenon causes the pressure applied to the work pieces to decrease in accordance with the instantaneous magnitude of the current, as shown by dotted curve $p_1$. When the metallic work pieces begin to flow slightly from the application of the welding current, the counter pressure exerted by the work pieces on the jaws of the pliers decreases and the pressure exerted on the work pieces decreases in accordance with dotted curve $p_2$. The total pressure drop caused by the electromagnetic force subtraction and the plasticity of the work pieces is shown by curve P.

The rate of heat input H developed at the welding surfaces is given by $$H = KI^2R \qquad (1)$$

where I is the current, R is the resistance, and K a constant depending on the material(s) to be welded, cleanliness of the surfaces, humidity, and so forth. Since the resistance of surfaces in contact is inversely proportional to pressure exerted on the surfaces, the rate of heat input may be given by $$H = K'\frac{I^2}{P} \qquad (2)$$

Returning now to Fig. 3, pressure is decreasing as the current increases from zero to some maximum value. An examination of Equation 2 shows that the rate of heat input to the weld will, over this portion of the welding cycle, increase in a manner shown by curve H. During the remaining portion of the welding cycle the rate of heat input decreases, as shown by curve H. The peak or burst of heat energy resulting is undesirable since it tends to burn out or explode the work pieces and otherwise produces an unsatisfactory weld.

Figure 4:
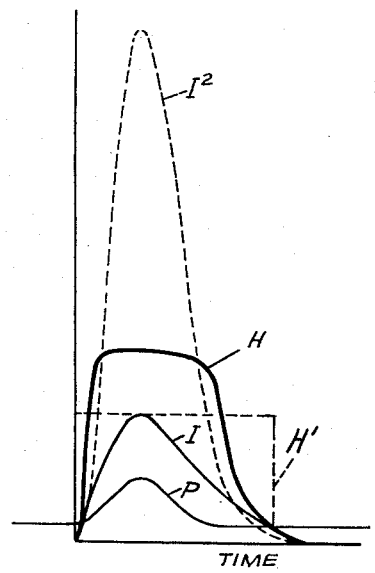
Fig. 4 is a curve illustrating operating characteristics of the welding pliers according to the invention.

The curves of Fig. 4 explain operating characteristics of the welding pliers according to the invention. The curves I and I² are identical to those of Fig. 3. Curve H' represents an ideal rate of heat input. To approach this ideal as closely as possible is a function of the present invention. By exerting a pressure on the work pieces which varies in magnitude substantially in phase with the change in magnitude of the welding current, as previously explained, pressure curve P is obtained. As shown in Fig. 4, the peak of the current impulse I is supplied to the work while the pressure is high. Referring again to Equation 2 it is evident not only that the ratio of I² to P is smaller than before but that said ratio remains more constant for changing values of I², because of the fact that the pressure P is substantially proportional to I². The resulting curve H more nearly approaches the ideal curve H'. Since the rate of heat input to the work remains more constant, a much more satisfactory weld can be obtained without danger of eruption or burning through of the work pieces to be welded.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An electric welding head comprising a pair of intersecting arms pivoted intermediate their ends, an electrode mounted at one end of each of said arms, means for applying force to the other ends of said arms to activate said arms so as to move said electrodes into contact with the work pieces to be welded, electrical connections from a source of welding current to said electrodes, an electromagnetic means operable upon said electrodes and responsive to said welding current for applying an additional force to said work pieces whose changes in magnitude are substantially in phase with changes in magnitude of said welding current.

2. An electric welding head comprising a pair of conductive arms pivoted intermediate their ends, an electrode mounted at one end of each of said conductive arms, means for applying force to the other ends of said conductive arms to activate said arms so as to move said electrodes into contact with the work pieces to be welded, means for applying a welding current impulse to said work pieces, an electromagnetic means operable upon said electrodes and responsive to said welding current impulse for applying an additional force on said work pieces whose magnitude changes substantially in phase with changes in magnitude of said welding current impulse.

3. An electric welding head comprising a pair of intersecting conductive arms pivoted intermediate their ends, an electrode mounted at one end of each of said conductive arms, an auxiliary arm mounted on said pivot, means including said auxiliary arm for applying a predetermined force to the other ends of said conductive arms to actuate them so as to move said electrodes into contact pressure with the work pieces to be welded, means further including said auxiliary arm and effective upon the application of said predetermined force for initiating the flow of welding current through said work pieces, an electromagnetic means operable upon said electrodes and responsive to said welding current for applying an additional force to said work pieces the changes in magnitude of which remain substantially in phase with changes in magnitude of said welding current.

4. An electric welding head comprising a pair of intersecting conductive arms pivoted intermediate theirs ends, an electrode mounted at one end of each of said conductive arms, an auxiliary arm mounted on said pivot, means for applying a predetermined force to the other ends of said conductive arms to move them closer together, means effective upon the application of said predetermined force for initiating the flow of welding current through said conductive arms, an electromagnetic means operable upon said electrodes and responsive to said welding current for causing an additional force to be applied between said conductive arms dependent upon the instantaneous value of said welding current.

5. An electric welding apparatus comprising a first conductive arm, a second conductive arm and an auxiliary arm, said arms being pivotally mounted together, a welding electrode supported in each of said conductive arms, control means including said auxiliary arm and responsive to the application of a compressive force between said first conductive arm and said auxiliary arm for moving said electrodes closer together by a predetermined amount, means for preventing a movement together of said electrodes by said control means in excess of said predetermined amount, means responsive to occurrence of said predetermined amount of movement for initiating the flow of a welding current through said conductive arms and electrodes, and means responsive to said flow of current for maintaining the force tending to pull said electrodes together dependent upon the instantaneous magnitude of said welding current.

6. An electric welding apparatus comprising a first conductive arm, a second conductive arm and an auxiliary arm, said arms being pivotally mounted together, a welding electrode supported in each of said conductive arms, control means including said auxiliary arm and responsive to the application of a compressive force between said first conductive arm and said auxiliary arm for moving said electrodes into contact with work pieces to be welded and for applying a predetermined force to said work pieces, means for preventing the application of a force to the work pieces by said control means in excess of a predetermined force, means responsive to the application of said predetermined force for initiating the flow of a welding current through said work pieces, and means responsive to said flow of current for effecting changes in magnitude of the force exerted on said work pieces which remains substantially in phase with changes in magnitude of said welding current.

7. An electric welding apparatus comprising a first conductive arm and a second conductive arm pivotally mounted upon a pivot pin located near one end of each of said arms, said conductive arms being insulated from one another, a welding electrode supported in each of said arms at said one end thereof, an auxiliary arm mounted at one end thereof on said pivot pin, control means including said auxiliary arm and responsive to the application of a compressive force between one of said conductive arms and said auxiliary arm for moving said electrodes into contact with the work pieces to be welded and for applying a predetermined force to said work pieces, means for preventing the application of a force to said work pieces by said control means in excess of said predetermined force, said control means being further responsive to the application of said predetermined force for initiating the flow of the welding current through said work pieces, and means responsive to said flow of current for producing changes in magnitude of the force on said work pieces which is substantially in phase with the changes in magnitude of said welding current.

8. An electric welding apparatus comprising a first conductive arm and a second conductive arm pivotally mounted upon a pivot pin located near one end of each of said arms, said conductive arms being insulated from one another, a welding electrode supported in each of said arms at said one end thereof, an auxiliary arm mounted at one end thereof on said pivot pin, control means including said auxiliary arm and responsive to the application of a compressive force between one of said conductive arms and said auxiliary arm for moving said electrodes into contact with the work pieces to be welded and for applying a predetermined force to said work pieces, means for preventing the application of a force to said work pieces by said control means in excess of said predetermined force, said control means being further responsive to the application of said predetermined force for initiating the flow of the welding current through said work pieces, and means including a solenoid having a coil connected in series with one of said conductive arms and an armature attached to the other of said conductive arms and responsive to said flow of current for producing changes in magnitude of the force on said work pieces which is substantially in phase with the changes in magnitude of said welding current.

9. An electric welding apparatus comprising first and second intersecting conductive arms pivotally connected at the point of intersection located near one end of each of said arms, said conductive arms being insulated from one another, a welding electrode supported in each of said arms at said one end thereof, an auxiliary arm mounted at one end thereof at said pivot, control means including said auxiliary arm and responsive to the application of a compressive force between one of said conductive arms and said auxiliary arm for moving said electrodes into contact with the work pieces to be welded and for applying a predetermined force to said work pieces, means for preventing the application of a force to said work pieces by said control means in excess of said predetermined force, said control means being further responsive to the application of said predetermined force for initiating the flow of a welding current through said work pieces, an electromagnetic device comprising a coil and an armature, said coil being part of the conductive path of said first conductive arm and said armature being attached to said second conductive arm, said electromagnetic device being responsive to said flow of current for producing changes in the force exerted on said work pieces which is substantially in phase with the changes in magnitude of said welding current.

References Cited in the file of this patent

UNITED STATES PATENTS

| Number | Name | Date |
| --- | --- | --- |
| 724,951 | Rowntree | Apr. 7, 1903 |
| 1,078,675 | Heany | Nov. 18, 1913 |
| 1,327,792 | Thornton | Jan. 13, 1920 |
| 2,473,772 | Vang | June 21, 1949 |

FOREIGN PATENTS

| Number | Country | Date |
| --- | --- | --- |
| 371,066 | Germany | Mar. 10, 1923 |
| 813,866 | Germany | Sept. 17, 1951 |